(12) United States Patent
Anderson et al.

(10) Patent No.: US 8,875,658 B2
(45) Date of Patent: Nov. 4, 2014

(54) PROJECTILE PET FOOD (75) Inventors: J. Clarke Anderson, Okemos, MI (US);
Eric Anderson, Ann Arbor, MI (US);
Timothy Colonnese, East Lansing, MI (US)

(73) Assignee: A.J. Boggs & Company, East Lansing, MI (US)

( * ) Notice: Subject to any disclaimer, the term of this patent is extended or adjusted under 35 U.S.C. 154(b) by 125 days.

(21) Appl. No.: 13/307,770

(22) Filed: Nov. 30, 2011

(65) Prior Publication Data
US 2013/0133581 A1 May 30, 2013

(51) Int. Cl.
*A01K 5/00* (2006.01)
*A01K 29/00* (2006.01)

(52) U.S. Cl.
USPC ........................................ 119/51.01

(58) Field of Classification Search
CPC . A01K 15/025; A01K 15/026; A01K 5/0114; A01K 39/014
USPC ......... 119/51.01, 52.1, 57.91, 61.2, 707, 709, 119/710, 711, 702; 473/569; 424/442, 439; 446/63; 102/501, 520; 124/27, 26
See application file for complete search history.

(56) References Cited

U.S. PATENT DOCUMENTS

| | | |
|---|---|---|
| 2,888,004 A | 5/1959 | Steiner |
| 3,009,453 A | 11/1961 | Ayala |
| 3,301,246 A | 1/1967 | Wolfe |
| 3,388,696 A | 6/1968 | Hoverath et al. |
| 3,540,426 A | 11/1970 | Lohr et al. |
| 3,685,828 A | 8/1972 | Getgey et al. |
| 4,738,724 A | 4/1988 | Wittwer et al. |
| 4,921,250 A | 5/1990 | Ayres |
| 5,043,196 A | 8/1991 | Lacourse et al. |
| 5,185,382 A | 2/1993 | Neumann et al. |
| 5,186,156 A | 2/1993 | Clayton |
| 5,208,267 A | 5/1993 | Neumann et al. |
| 5,224,464 A | 7/1993 | Burnham et al. |
| 5,242,323 A | 9/1993 | Rappaport |
| 5,267,549 A | 12/1993 | Webber |
| 5,320,359 A | 6/1994 | Harwell et al. |
| 5,353,712 A | 10/1994 | Olson |
| 5,360,830 A | 11/1994 | Bastioli et al. |
| 5,393,804 A | 2/1995 | George et al. |
| 5,589,830 A | 12/1996 | Linz et al. |
| 5,736,586 A | 4/1998 | Bastioli et al. |
| 5,787,869 A | 8/1998 | Johnson et al. |
| 5,797,385 A | 8/1998 | Thai |

(Continued)

OTHER PUBLICATIONS

Biodegradable Darts, nerfhaven.com, retrieved Aug. 17, 2011.

(Continued)

*Primary Examiner* — Trinh Nguyen
(74) *Attorney, Agent, or Firm* — Dickinson Wright PLLC (57) ABSTRACT

An edible animal food projectile is provided. The projectile is compatible for being launched from a launching apparatus such as a toy gun or the like. The projectile includes an edible body made from a starch-based material consisting essentially of an expanded starch. The edible body is formed into a predefined geometry operable to receive a launching force causing temporary flight of the projectile and having a first density. A payload is embedded on or within the edible body and the payload is formed from a material having a second density greater than the first density of the edible body. The payload can be food, medicine, and the like.

15 Claims, 5 Drawing Sheets

(56) References Cited

U.S. PATENT DOCUMENTS

| | | |
|---|---|---|
| 5,801,207 A | 9/1998 | Bastioli et al. |
| 5,924,413 A | 7/1999 | Johnson et al. |
| 6,001,385 A | 12/1999 | Van De Wijdeven |
| 6,107,371 A | 8/2000 | Roesser et al. |
| 6,211,325 B1 | 4/2001 | Sun et al. |
| 6,408,837 B1 | 6/2002 | Johnson et al. |
| 6,701,818 B1 | 3/2004 | O'Dwyer |
| 6,860,187 B2 | 3/2005 | O'Dwyer |
| 6,946,506 B2 | 9/2005 | Bond et al. |
| 7,100,539 B2 | 9/2006 | Levan |
| 7,156,085 B2 | 1/2007 | Lewis et al. |
| 7,458,371 B2 | 12/2008 | Ong et al. |
| 7,537,001 B2 | 5/2009 | Ma |
| 7,640,922 B2 | 1/2010 | Siebelink |
| 7,677,232 B2 | 3/2010 | Rosenblum et al. |
| 7,748,369 B2 | 7/2010 | Chee |
| 7,851,001 B2 * | 12/2010 | Axelrod .................. 426/132 |
| 7,882,829 B2 | 2/2011 | Witzigreuter |
| 7,901,303 B2 | 3/2011 | Toyosawa |
| 2005/0022657 A1 | 2/2005 | O'Dwyer |
| 2008/0254705 A1 | 10/2008 | Mathis |
| 2010/0059031 A1 | 3/2010 | Siebelink |
| 2011/0192314 A1 | 8/2011 | Ritt |

OTHER PUBLICATIONS

Homemade Biodegradable Nell Darts, forums.humansvszombies.org, retrieved Aug. 17, 2011.

* cited by examiner

PROJECTILE PET FOOD

BACKGROUND

1. Field of the Invention

The present disclosure relates an edible projectile for use with animals, particularly an edible and biodegradable food projectile safe for use with pets and other animals.

2. Description of the Related Art

Projectile launchers as toys exist that use soft, safe foam darts as well as balls, flying discs, and the like. These launchers have a high appeal because of the play value they provide as well as their ability to be safely used by children. Due to their popularity, many launchers and foam projectiles have been developed in conjunction a variety of launcher combinations. These combinations have included, but are not limited to, bow and arrows of the type disclosed in the U.S. Pat. No. 5,224,464 to Burnham et at., foam ball launchers of the type disclosed in U.S. Pat. No. 5,267,549 to Webber, and foam dart launchers of the type disclosed in U.S. Pat. No. 7,537,001 to Ma and in U.S. Pat. App. No. 2010/0059031 to Siebelink. Other launchers, capable of launching a plurality of projectiles from a magazine have also been developed such as U.S. Pat. No. 5,186,156 to Clayton.

Soft projectile launchers are also disclosed in U.S. Pat. No. 2,888,004 to Steiner; U.S. Pat. No. 3,009,453 to Ayala; U.S. Pat. No. 3,301,246 to Wolfe; U.S. Pat. No. 3,388,696 to Hoverath et at.; U.S. Pat. No. 3,540,426 to Lohr et at.; U.S. Pat. No. 3,685,828 to Getgey et at.; U.S. Pat. No. 5,242,323 to Rappaport; U.S. Pat. No. 7,882,829 to Witzigreuter; U.S. Pat. No. 7,640,922 to Siebelink; U.S. Pat. No. 7,458,371 to Ong, et al.; and U.S. Pat. No. 7,156,085 to Lewis et al.

Launchers can be fed by rotating firing assemblies or magazines containing multiple projectiles similar to the type disclosed by U.S. Pat. No. 5,797,385 to Thai; U.S. Pat. No. 7,677,232 to Rosenblum et al.; and by U.S. Pat. Nos. 6,408,837; 5,924,413; and 5,787,869 to Johnson et al.

Manufacture of starch foam materials are known in the art. Starch foam expanded with polyvinyl alcohol ("PVA") is used in applications that require good flexibility or low embrittlement and as described in U.S. Pat. Nos. 5,043,196 and 5,043,196 to N. L. Lacourse et al., and in U.S. Pat. No. 6,107,371 to Roesser, et al. Other disclosures include U.S. Pat. No. 5,393,804 to E. George et al which shows the formation of articles using biodegradable compositions comprising converted or degraded starch of low molecular weight, a plasticizer and alkenol polymers. U.S. Pat. Nos. 5,360,830; 5,589,830; 5,736,586; and 5,801,207 to Bastioli et al. disclose foams from blends of starch with 10-30% of polymers such as PVA, poly (caprolactone), cellulose acetate, poly (ethylene vinyl alcohol), and poly (ethylene-co-acrylic acid). Technology to make biodegradable starch-based foams using polyglycols is disclosed in U.S. Pat. No. 5,185,382 to Neumann and U.S. Pat. No. 5,208,267 to Seib. Methods for forming biodegradable polymers from starch and polylactic acids ("PLA") are disclosed in U.S. Pat. No. 6,211,325 to Xiuzhi, et al. A biodegradable polymer composition from starch, thermo plastic polymers, and plasticizers is disclosed in U.S. Pat. No. 6,946,506 to Bond et al.

A need remains for a safe, biodegradable and edible foam projectile adapted to be launched for use with pets and animals.

SUMMARY

The present disclosure relates to an edible animal food projectile including: (a) an edible body made from a starch-based material consisting essentially of an expanded starch, the edible body formed into a predefined geometry operable to receive a launching force causing temporary flight of the projectile and having a first density; and (b) a payload embedded on or within the edible body. The payload is formed from a material having a second density greater than the first density of the edible body. The expanded starch can be a foam material defining a spring foam characteristic. The foam material can be of the kind that allows for bonding to the payload. In an example, the starch-based materials include expanded starch mixed with a polymer. The starch-based materials can be fabricated from alkylene oxide modified starches and having an amylose content of 30% or more by weight. In a further example, the amylose content of the starch-based material is 70% or more by weight. The payload can be selected from the group consisting of food, medicine, vitamins, foam, tracking devices, medical devices, and combinations thereof.

In a further example, the payload is embedded within the edible body and the edible body defines a spherical geometry enclosing the payload. In another example, the projectile can define a modified disc shape or "flying disc" geometry with the payload in a disc or ring shape in the center of the edible body which forms a cushion around the payload. In another example, the edible body defines a cylindrical geometry having opposed front and rear ends and the payload is enclosed and embedded within the cylindrical body. The payload can be positioned closer to the front end forming an unbalanced weight distribution along a length of the cylindrical body. In a further example, the edible body defines a cylindrical geometry having opposed front and rear ends and the payload is mounted to the front end. The payload can form a recessed opening adapted to mount to and fit around the front end of the cylindrical body. In even yet a further example, the payload at least partially overlaps along outer circumferential sides of the cylindrical body. The edible body can further define a bored opening at the rear end of the cylindrical body. The bored opening can be formed substantially centered in a base defined at the rear end of the cylindrical body and extending a predetermined interior length into the cylindrical body. The bored opening is operable to securely engage a launching feature of a launching apparatus.

In even still yet another example, the payload can define a cylindrical portion and a conical portion having a base tapering to a point. The base of the conical portion extends from the cylindrical portion, and the edible body forms at least one bumper mounted to the cylindrical portion. A second edible bumper can be mounted on the tapered point of the conical portion of the payload.

In a further example, the edible body includes a visible indicia of color. The projectile can define a color suitable for a dog and the color can be selected from a yellow color spectrum defined by a wavelength interval between about 590-560 nm and a frequency interval between about 510-540 THz or a blue color spectrum defined by a wavelength interval between about 490-450 nm and a frequency interval between about 610-670 THz.

The present disclosure further provides for a launching apparatus and edible animal food projectile therefor including: (a) a launching apparatus including a launching portion; (b) an animal food projectile, the projectile including an edible body made from a starch-based material consisting essentially of an expanded starch, the edible body formed into a predefined geometry and having a first density; and a payload embedded on or within the edible body, the payload being formed from a material having a second density greater than the first density of the edible body; and the edible body configured to operatively engage the launching portion of the launching apparatus and to be forcibly ejected thereby with a launching force sufficient to cause separation of the projectile from the launching apparatus and temporary flight. The launching apparatus can include a magazine adapted to hold a plurality of projectiles feeding into the launching portion of the launching apparatus. In a further example, the launching apparatus is supported in an articulating stand adapted to direct projectiles towards a designated feeding location for delivery of the projectiles to an animal. This articulating stand can be positioned at a zoo or the like.

The present disclosure further provides for a method for feeding an animal including the steps of: (a) providing a launching apparatus including a launching portion; (b) forming an animal food projectile including an edible body made having a first density from a starch-based material consisting essentially of an expanded starch, said forming step including shaping the projectile into a predefined geometry; said forming step including embedding a payload on or within the edible body, the payload being formed from a material having a second density greater than the first density of the edible body; (c) operatively engaging the edible body with the launching portion of the launching apparatus; and (d) forcibly ejecting the projectile with a launching force sufficient to cause separation of the projectile from the launching apparatus and temporary flight.

Other features and advantages of the present disclosure will be readily appreciated, as the same becomes better understood after reading the subsequent description taken in conjunction with the accompanying drawings.

BRIEF DESCRIPTION OF THE DRAWINGS

The features and advantages of the present invention will become more readily apparent when taken in conjunction with the following figures and illustrations.

DETAILED DESCRIPTION OF THE PREFERRED EMBODIMENTS

The present disclosure provides for an animal food projectile and method of use related to a sabot-like edible projectile adapted for use with a toy gun or launching apparatus, often referred to as a "launcher". The launcher and edible projectile can be used to feed and exercise pets, particularly dogs. The projectile can include a two-part construction having a main body forming a shaft or a shell made of expanded starch-based material such as cornstarch (e.g., MAGIC NUUDLES). Expandable cornstarch, also referred to as extruded starch, can be used to construct the edible body. A heavier and/or denser payload of a food or treat suitable to the pet or animal is embedded on or inside the edible body. The projectile is biodegradable and can be referred to as "bio friendly" and can be specifically constructed to feed a specific type of animal. The edible payload can be either attached to or encased within the edible body.

In an example, a dog owner can launch a dart shaped projectile according to the present disclosure intended to entice their dog(s) to fetch and eat as a form of exercise and nutrition. In addition to pets, projectiles of the present disclosure can be used to feed other wild and domestic animals, in wilderness areas, or on farms, ranches, wild game park reserves, or at zoological parks. Zoos can provide safe stationary launching devices to allow visitors to shoot (i.e., launch) food into the animal exhibits to encourage the animals to exercise while also providing meals or treats. This also provides for an entertaining and interactive experience for the zoo patrons.

In an example, the present disclosure provides for an expanded (e.g., extruded) starch animal food projectiles, in cylindrical (i.e., dart) and spherical (e.g., ball) shapes, which can be projected with a launching apparatus. The extruded starch projectiles are edible and may also carry medicines for animals to retrieve and eat. Additionally geometries are further considered and within the scope of the present disclosure. For example, disc shaped or oval-like shaped geometries for a food projectile made of a starch-based material are also considered within the scope of the present disclosure.

The starch can be formed as a foam starch having foam characteristics. Example starches can include about 10% or more by weight of amylose. Preferably the starch includes 30% or more of amylose and even more preferably the starch includes 70% or more of amylose. A foam starch pet food projectile can be formed into different continuous and discontinuous shapes, such as a soft cylindrical dart, or spherical ball shape, and launched from a launching apparatus. The projectile can be made of an extruded starch material that has a foam quality that is dissolvable as well as able to absorb and retain water soluble and non-water soluble liquids. This can be beneficial if intending to deliver both food and medicine. The foam projectile provides a cushioned benefit by adding a spring characteristic to the food projectile that improves its performance as a projectile, offering a cushion upon landing and a less dense, safer and less damaging projectile. Since the starch foam is able to absorb and retain liquids, the projectile also offers an improved vehicle for the delivery of liquid medicines. The foam material may enhance the projectile in launchers with air pressure that are enhanced with a slight seal to build-up more pressure before the launch, since the starch material offers the ability to create an air seal in the launcher to build-up air pressure in the gun before the launch. The projectile can include indicia such as bright colors that make it more identifiable and easier for animals to find and retrieve.

The low density extruded starch material of the projectile can be resilient (i.e., flexible and not brittle), allowing it to be used with many soft foam launching devices, providing a safe projectile, as well as a vehicle for the delivery of food, treats, or medicinal payloads, being dissolvable in water, and environmentally sustainable (biodegradable). In an example, the projectile is formed of low density, high amylose starch materials as a foam buffer (i.e., capsule) to be launched with a launching apparatus.

The term "launcher" can refer to any launching apparatus adapted to apply a launching force to the projectile causing the projectile to at least temporarily fly through the air before landing at a point away from a launch point. The launcher can be any one of a toy pistol, toy revolver, toy firearm, toy shotgun, toy rifle, toy semiautomatic weapon, catapult, cannon, bow, sling shot, toy automatic weapon, toy gun, and a throwing hand or the like.

A projectile, made from expanded starch foam, can include a mix of additives, such as flavors, colors, medicines, vitamins, or preservatives. In an example, the starch may be unmodified starch, a modified starch, or a mixture thereof. The starch may be selected from any plant source operable to provide edible starch material such as corn, potato, tapioca, wheat, rice, sago, and sorghum and preferably corn and tapioca. The starch may be high amylose (i.e., greater than 30% and preferably greater than 70%) starch.

Selecting a color for the projectile can be specified to a particular animal intended for retrieving of the projectile. In an example of using the projectile for a dog, certain colors are favorable over others. Projectiles formulated in the yellow color spectrum (wavelength interval between about 590-560 nm and frequency interval between about 510-540 THz) or the blue color spectrum (wavelength interval between about 490-450 nm and frequency interval between about 610-670 THz) are easier for dogs to see and retrieve.

Humans have seven times higher proportion of cone cells than dogs, meaning that when dogs do see colors, they are pale or faded. However dogs have a much higher concentration of rod cells, responsible for seeing black-and-white, and also much more sensitive in lower light conditions. For that reason, dogs have much better night vision than people.

The present disclosure provides for a payload, embedded inside or otherwise attached to the edible body. When the projectile defines a cylindrical shape, the payload can be embedded adjacent one end and inside the cylinder, or appended to one end. In an embodiment where the payload is attached to one end, the leading end (e.g., head) of the projectile is weighted relative to the rest of the cylinder to improve its aerodynamics. The payload is fabricated from a denser material relative to the edible body to improve flight. The payload could be any edible denser material including but not limited to: medicine, vitamins, denser starch foam, or small devices used for tracking or medical purposes. When the projectile is of a spherical shape (e.g., a ball), the payload can be centered inside the edible body. In a further example, the projectile can be a modified spherical shape, such as an oval shape with the payload shifted to move the center of gravity towards a leading end of the projectile. In yet a further example, the edible starch body is shaped into a disc or annular shape which can be referred to as a "flying disc" enclosing or at least partially surrounding the payload. In even a further example, the payload is disc-shaped having a foam (i.e., starch-based) bumper surrounding a perimeter of the payload.

In yet a further exemplary embodiment the projectile is constructed of a discontinuous starch edible body portion composed of multiple components. For example, a projectile in which a starch is split into a forward and rear bumper the payload sandwiched therebetween such that more mass is positioned in the forward bumper and tapered to the rear bumper for improved performance as a projectile.

As depicted in FIGS. 1A-5C, example projectiles according to the present disclosure are shown. Projectiles 10, 20, 30, 40, and 50, each define a unique geometry. In these examples, the projectiles include an edible body portion 11, 21, 31, 41, 51, and 51', respectively and are constructed from a foam (extruded, expanded, or other) starch material. The starch material can be relatively light-weight and resilient for use with a launcher.

Projectiles 10 and 20 encapsulate a payload 12 and 22 respectively. Projectile 10 includes an edible body 11 having a spherical shape and enclosing a centrally positioned payload 12. Payload 12 also defines a spherical geometry sized to fit within edible body 11. Projectile 20 includes an edible body 21 having a cylindrical shape having opposite ends 23 and 24 and enclosing an off-centered positioned payload 22. In this example, payload 22 is positioned relatively centered with respect to a diameter cross section of the cylindrical body 21 and closer to front end 23 relative to back end 24. In this example, payload 22 is shown as having a cylindrical geometry proportionally sized down from the edible body 21. However, it is not necessary for the geometries of the payload and edible body to be similar. Payloads 12 and 22 can be made of a variety of materials including but not limited to: medicine, food, medical devices, and the like. All of the projectiles can be sized and shaped to cooperate with any particular launcher including preexisting toy guns.

Figure 1A:
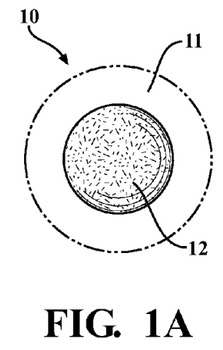
FIGS. 1A-1C illustrate an example projectile defining a spherical geometry of an edible body enclosing an embedded payload in a three dimensional transparent view, a perspective view, and a cross section view.
Figure 1B:
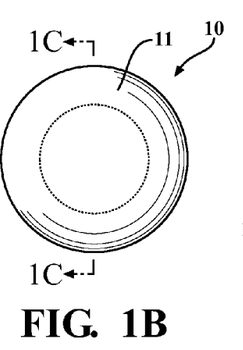
Figure 1C:
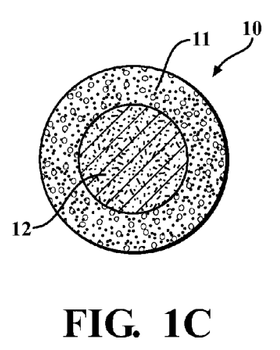
Figure 2A:
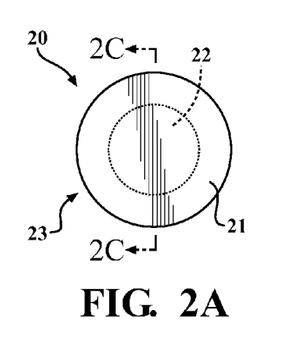
FIGS. 2A-2C illustrate an example projectile defining a cylindrical geometry of an edible body enclosing an embedded payload in an end view, a transparent perspective view, and a length-wise cross section view.
Figure 2B:
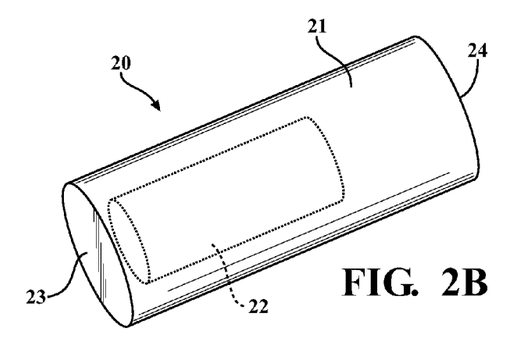
Figure 2C:
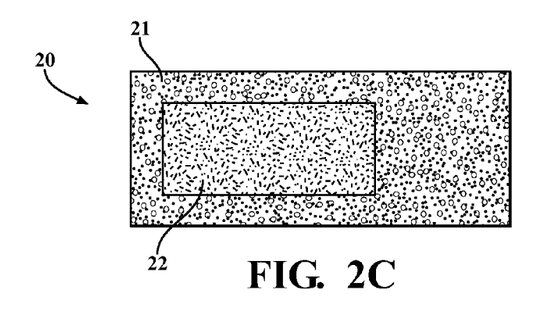
Figure 3A:
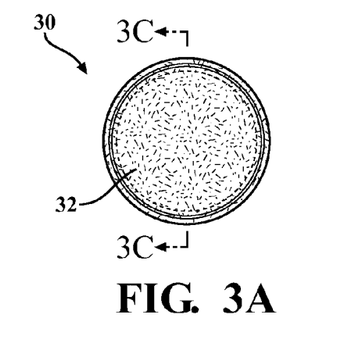
FIGS. 3A-3C illustrate an example projectile defining a cylindrical geometry of an edible body with an appended payload in an end view, a perspective view, and a length-wise cross section view.
Figure 3B:
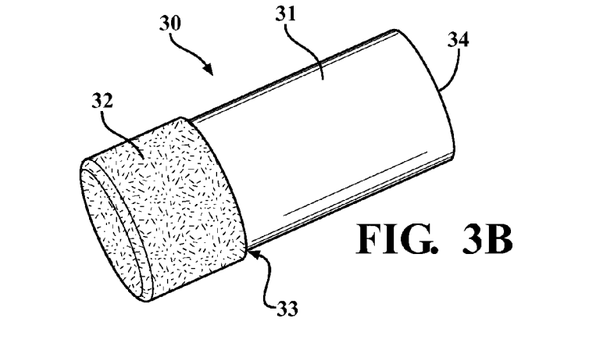
Figure 3C:
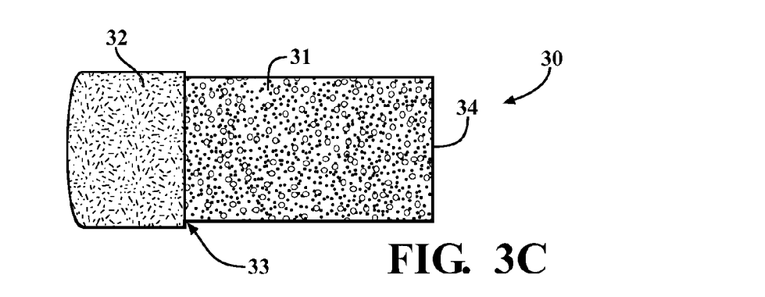

FIGS. 3A-3C depict a cylindrical projectile 30 including an edible starch cylindrical body 31 having opposite ends 33 and 34 and a payload 32 appended to a front end 33 of the projectile 30. The appended payload 32 is heavier (i.e., more dense) than edible body 31 and thus provides a front loaded projectile for improved flight when launched. The starch material of edible body 31 can provide for an adhesive characteristic to allow for appending payload 32 to end 33.

Figure 4A:
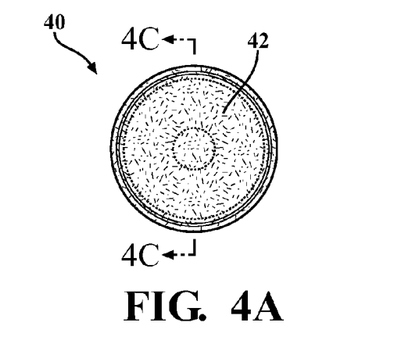
FIGS. 4A-4C illustrate an example projectile defining a cylindrical geometry of an edible body with an appended payload further defining a bored-out opening through the opposite end of the payload for cooperation with a launching feature of a launching device shown in an end view, a transparent perspective view, and a length-wise cross section view.
Figure 4B:
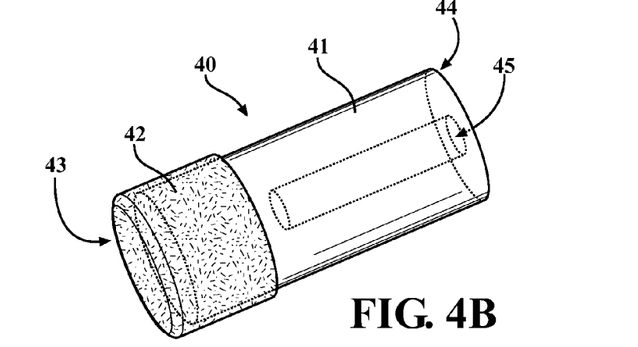
Figure 4C:
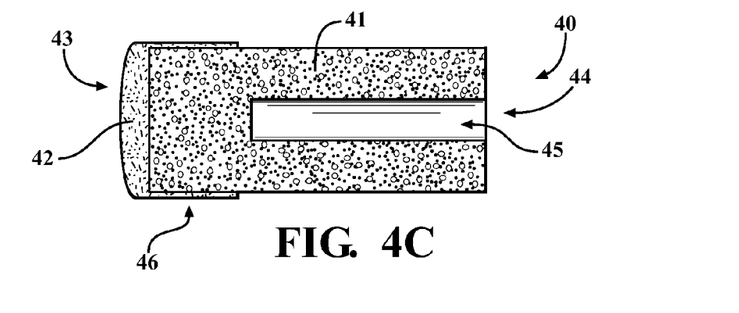

FIGS. 4A-4C depict a projectile 40 including an edible starch elongated cylindrical body 41 having opposite ends 43 and 44 and a forward overlapping payload 42 appended to front end 43. In this example, an opening 45 is bored into rear end 44. Opening bore 45 extends partially along a longitudinal axis of the elongated cylindrical body 41. In this example, opening 45 is positioned centrally with respect to a circular base defined on rear end 44 of cylindrical body 41. Opening 45 is sized and shaped to mount to and cooperate with a launching feature of a launcher requiring a rear bore. The forward overlapping payload 42 can define a recessed portion 46 to receive front end 43 for improved appending.

Figure 5A:
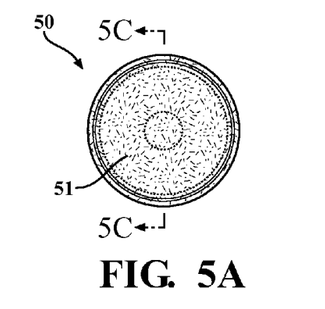
FIGS. 5A-5C illustrate an example projectile defining a conical geometry of a starch-based body with an appended payloads at opposite ends in an end view, a perspective view, and a length-wise cross section view.
Figure 5B:
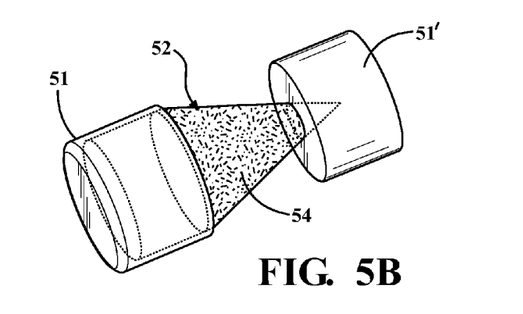
Figure 5C:
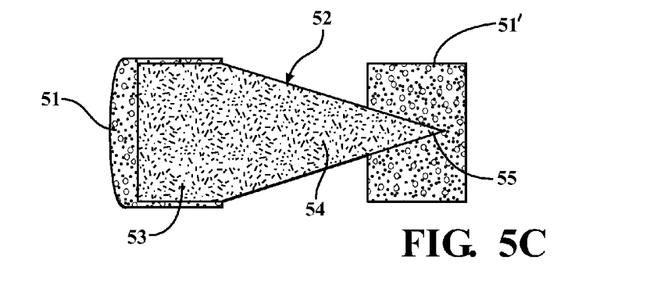

FIGS. 5A-5C depict a projectile 50 including a payload 52 sandwiched between a pair of edible body portions 51 and 51' referred to as a forward bumper 51 and rear bumper 51' composed of edible starch. Payload 52 is formed of a cylindrical portion 53 and a conical portion 54 that extends from the cylindrical portion 53 and tapers to a point 55. Cylindrical portion 53 at least partially securely fits within bumper 51 and tapered conical portion 54 at least partially securely fits within bumper 51'. Bumper 51 provides a layer of cushioning to increase safety of the projectile 50 while in flight. The rear bumper 51' provides a fitting in launchers to allow proper launching. The payload 52 will be heavier at the forward bumper 51 than the rear bumper 51' to improve the aerodynamics of the projectile.

Figure 6:
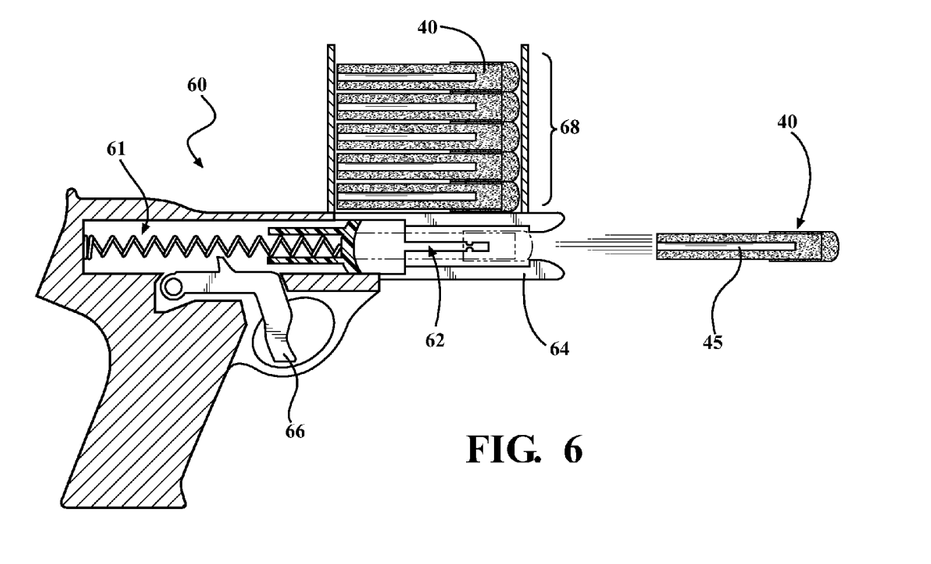
FIG. 6 illustrates an example launching apparatus operable for use with a projectile according to the present disclosure.

FIG. 6 illustrates an example launching apparatus 60 having a launching portion or launching feature 62. Launching apparatus 60 resembles a "toy gun" having a chamber 64 sized to receive a projectile for ejecting upon activation of a launching force. Naturally, the launching apparatus could take many different forms with the toy pistol embodiment serving for illustrative purposes only. In this example, launching apparatus 60 includes a spring loaded trigger feature 66 connected to a launching feature 62 adapted to engage a projectile 40. Launching feature 62 securely fits into bored opening 45 of projectile 40. The trigger 66 can be manually activated causing the spring 61 to release resulting in tension and subsequently release kinetic energy into launching feature 62 to eject projectile 40 out of chamber 64. In this example, launching apparatus 60 includes a magazine 68 which can hold a plurality of projectiles 40 adapted to feed the projectiles 40 into chamber 64. A foam projectile may enhance performance in launcher 60 in examples where the launcher utilizes air pressure. The foam allows for a slight seal to build-up more pressure before the launch, since the starch material offers the ability to create an air seal in the launcher. Some elastic starch foams provide this added benefit.

Figure 9A:
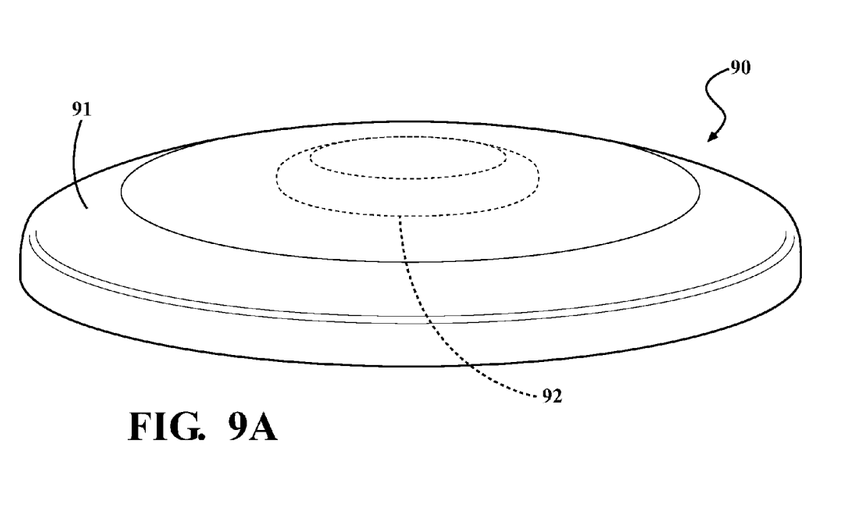
FIGS. 9A-9B illustrate an example projectile defining a disc like or annular geometry of a starch-based body enclosing or partially surrounding a payload.
Figure 9B:
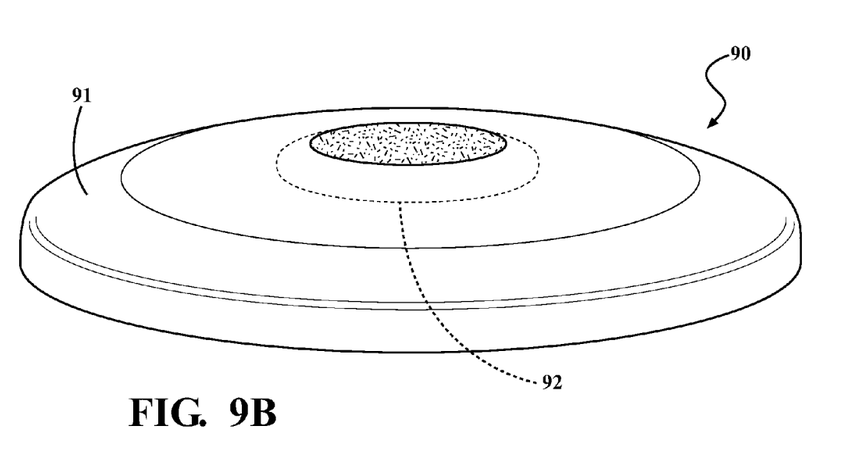

Referring to FIGS. 9A-9B, further example projectiles 90 and 90' defining disc shape geometries are shown. In these alternative embodiments, the cylindrical geometry of the edible body 91 and 91' may take the shape of a flying disc (body 91) or annulus (body 91'). In these cases, the opposed front and rear ends form the upper and lower sides of the flying disc, and the payload 92 and 92' may be enclosed or stationed in a central location to maintain spinning balance when thrown by hand or suitable launching apparatus. In FIG. 9A, a disc 90 is shown such that the edible starch body 91 fully encloses a payload 92. in FIG. 9B, payload 92' is exposed, yet still surrounded along a perimeter by a starch bumper 91'.

All of the projectiles, FIGS. 1A-5C are meant to be, but not limited to being compatible with current and future launcher configurations. The projectiles are also meant to be, but not limited to being compatible with current and future magazines and rotating firing assembly.

Figure 7:
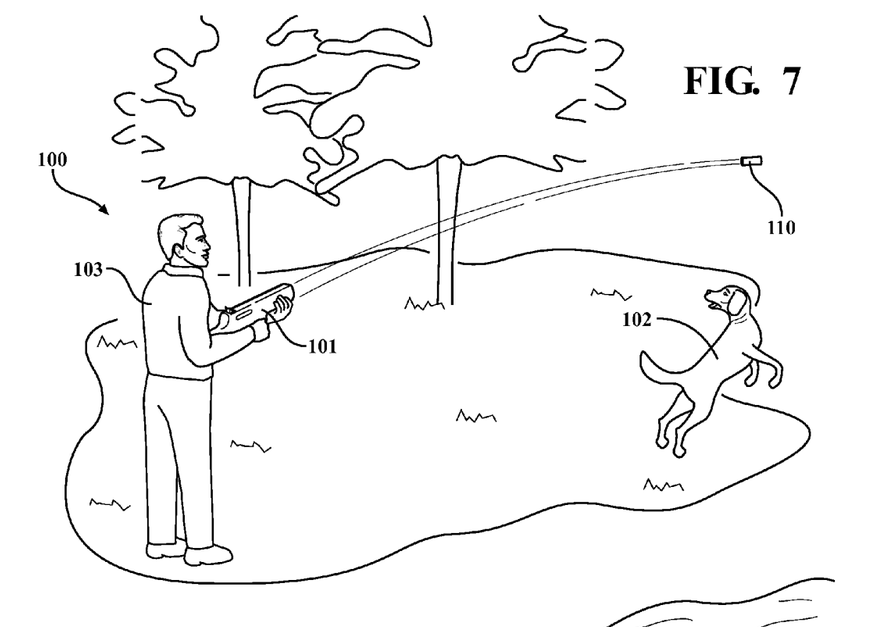
FIG. 7 is an example environmental view of a projectile in use with a launcher for exercising a pet.

FIG. 7 illustrates an example environmental use application of an edible food projectile 110 according to the present disclosure. FIG. 7 shows a park 100 with a user 103 and the user's pet 102. In this example, projectile 110 is being launched from a launcher 101 taking place inside park 100. User 103 launches projectile 110 by activating the launching force of launcher 101. The launching of projectile 110 can be intended to feed, exercise, and/or medicate pet 102. Pet 102 is then able to track down the landing location of projectile 110 and either retrieve it or eat it if the pet so chooses.

Figure 8:
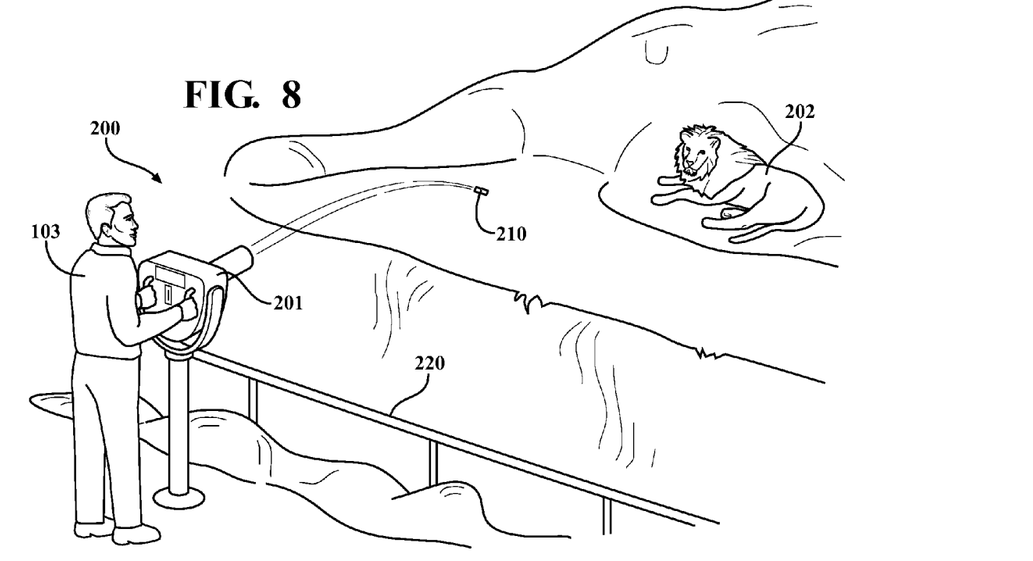
FIG. 8 is an example environmental view of a projectile in use with a launcher for delivering food to a zoo animal.

FIG. 8 illustrates an example environmental use application of an edible food projectile 210 according to the present disclosure. FIG. 8 shows a zoological animal exhibit 200 enclosed by a fence 220 and allowing observing of at least one animal 202. In this example, projectile 210 is being launched from a launcher 201 located outside of fence 220. Projectile 210 can be launched by activating the launching force of launcher 201. The launching of projectile 210 can be intended to either feed, exercise, and/or medicate animal 202. Animal 202 is then able to track down the landing location of projectile 210 and either retrieve it or eat it if the animal so chooses.

Many modifications and variations of the present disclosure are possible in light of the above teachings. Therefore, within the scope of the appended claim, the present disclosure may be practiced other than as specifically described.

What is claimed is:

1. An edible animal food projectile comprising:
   an edible body made from a starch-based material consisting essentially of an expanded starch fabricated from alkylene oxide modified starches and having an amylose content of 30% or more by weight, the edible body formed into a predefined geometry operable to receive a launching force causing temporary flight of the projectile and having a first density; and
   a payload embedded on or within the edible body, wherein the payload is formed from a material having a second density greater than the first density of the edible body.

2. The projectile of claim 1 wherein the expanded starch is a foam material defining a spring foam characteristic and wherein the foam allows for direct bonding to the payload.

3. The projectile of claim 1 wherein the starch-based materials include expanded starch mixed with a polymer based on an alkylene oxide.

4. The projectile of claim 1 wherein the amylose content is 70% or more by weight.

5. The projectile of claim 1 wherein the payload includes a material selected from the group consisting of food, medicine, vitamins, foam, tracking devices, medical devices, and combinations thereof.

6. The projectile of claim 1 wherein the payload is embedded within the edible body and the edible body defines a spherical geometry enclosing the payload.

7. The projectile of claim 1 wherein the payload is embedded within the edible body and the edible body defines a cylindrical geometry having opposed front and rear ends and the payload is enclosed within the cylindrical body positioned closer to the front end forming an unbalanced weight distribution along a length of the cylindrical body.

8. The projectile of claim 1 wherein the edible body defines cylindrical geometry having opposite front and rear ends and the payload is mounted directly to the front end.

9. The projectile of claim 8 wherein the payload forms a recessed opening adapted to mount to and fit around the front end of the cylindrical body and the payload at least partially overlaps along outer circumferential sides of the cylindrical body.

10. The projectile of claim 8 wherein the edible body defines a bored opening at the rear end of the cylindrical body formed substantially center of a circular base defined on the rear end of the cylindrical body and extends a predetermined interior length into the cylindrical body operable to securely engage a launching feature of a launching apparatus.

11. The projectile of claim 1 wherein the payload defines a cylindrical portion and a conical portion having a base tapering to a point, wherein the base of the conical portion extends from the cylindrical portion, and the edible body forms at least one bumper mounted to the cylindrical portion.

12. The projectile of claim 11 further comprising a second edible bumper mounted on the tapered point of the conical portion of the payload.

13. The projectile of claim 1 wherein the edible body defines a disc-shaped geometry at least partially surrounding the payload and sized and shaped to maintain spinning balance when launched by a launching force.

14. The projectile of claim 1 wherein the edible body includes a visible indicia of color.

15. The projectile of claim 14 wherein the projectile defines a color suitable for a dog and the color is selected from a yellow color spectrum defined by a wavelength interval between about 590-560 nm and a frequency interval between about 510-540 THz or a blue color spectrum defined by a wavelength interval between about 490-450 nm and a frequency interval between about 610-670 THz.

* * * * *